United States Patent

Ubert et al.

[11] Patent Number: 5,683,604
[45] Date of Patent: Nov. 4, 1997

[54] HOT AIR OVEN WITH PARTICLE DIVERTER

[75] Inventors: Harald Ubert, Raesfeld; Joachim Barthel, Reken, both of Germany

[73] Assignee: Ubert Gastrotechnik G.m.b.H., Raesfeld, Germany

[21] Appl. No.: 541,405

[22] Filed: Oct. 10, 1995

[30] Foreign Application Priority Data

Oct. 10, 1994 [DE] Germany ............... 44 36 049.5

[51] Int. Cl.$^6$ .............. F27D 7/04; A21B 1/26; B01D 45/00
[52] U.S. Cl. .............. 219/400; 99/469; 432/67; 432/68; 55/440
[58] Field of Search .............. 219/385, 388, 219/390, 391, 400, 681, 682, 686; 99/474, 479, 469; 126/21 A; 432/67, 68; 55/278, 434, 440

[56] References Cited

U.S. PATENT DOCUMENTS

| 4,155,294 | 5/1979 | Langhammer et al. | 99/427 |
| 4,295,419 | 10/1981 | Langhammer et al. | 99/427 |
| 4,690,701 | 9/1987 | Edrick et al. | 55/440 |
| 4,869,155 | 9/1989 | Grieve | 219/400 |
| 5,097,754 | 3/1992 | Covington et al. | 219/400 |
| 5,317,127 | 5/1994 | Brewster et al. | 219/388 |
| 5,417,148 | 5/1995 | Cavallo | 219/400 |
| 5,419,239 | 5/1995 | Covington et al. | 219/400 |

FOREIGN PATENT DOCUMENTS

| 21 44 358 | 3/1973 | Germany . |
| 0 152 281 | 11/1981 | Germany . |
| 2 270 638 | 3/1994 | United Kingdom . |
| WO 93-18349 A1 | 9/1993 | WIPO . |

*Primary Examiner*—Teresa J. Walberg
*Assistant Examiner*—J. Pelham
*Attorney, Agent, or Firm*—Milton Oliver

[57] ABSTRACT

The invention relates to a hot air oven for the preparation of foodstuffs, with a housing with four housing side walls, a bottom and a housing cover, with a cooking chamber delimited by four side walls 4 as well as a bottom 2 and a ceiling 3, with a first blower 6 for generating a hot air flow in the cooking chamber, with a rotatable basket 5 for the foodstuffs, which can be inserted into the cooking chamber, wherein the hot air stream flows through the basket 5 during oven operation, with a control device for the course of the cooking progress, wherein the control device includes a temperature control, and with at least one incoming air conduit and at least one air outlet conduit 6, wherein at least one separation device 10 serving to separate out particles conveyed in the hot air flow is provided.

12 Claims, 2 Drawing Sheets

HOT AIR OVEN WITH PARTICLE DIVERTER

FIELD OF THE INVENTION

The instant invention relates to a hot air oven for the preparation of foodstuffs.

BACKGROUND

A hot air oven for the preparation of foodstuffs is known from application PCT/SE93/00204, HANSSON, wherein frozen foodstuffs, such as French fries, can be introduced in a wire basket into a cooking chamber in which they are then cooked in hot air.

A similar device is also known from U.S. Pat. No. 4,155,294, LANGHAMMER et al. A rotating basket for foodstuffs is provided here, too, through which a flow of hot air then passes, so that foodstuffs are cooked and browned.

An effect occurs in such hot air ovens, in particular in connection with the preparation of French fries, that because of the movement, small particles fall off the French fries and are then conveyed in the air flow. Because of their small size, these particles are browned more rapidly than the actual foodstuffs, on which they occasionally come to rest, however. The finished prepared product can therefore be covered by small, dark particles, so that at least an unpleasant visual impression is created. Since these particles are also very strongly roasted, an impairment of the taste of the foodstuffs must also be expected.

SUMMARY OF THE INVENTION

It is therefore the object of the invention to create a hot air oven wherein such particles reach the foodstuffs at a decreased rate or not at all.

Since at least one separation device for the particles conveyed by the hot air flow is provided, these particles are depleted in the hot air stream and their concentration in the cooking chamber is reduced.

It is advantageous if the separation device has means for affecting the hot air flow, wherein this influence then leads to the separation of the particles. The separation device can be manufactured in a simple manner if it includes strips. The means for affecting the air flow are particularly effective if they are arranged essentially crosswise to the movement of the air stream. The separation device can furthermore be arranged in a spatially advantageous manner parallel with the housing bottom of the hot air oven.

If the separation device contains an essentially flat sheet metal plate, from which a number of strip-like areas are bent off at an angle, the separation device can be produced cost-effectively as a simple part bent by stamping.

The strip-like areas are particularly effective if they are downwardly angled at 15° to 86° in respect to the level of the separation device.

The same applies if the edge of the strip-like areas located in the flow direction, i.e. the free edge of the strips, lies 3 mm to 18 mm below the level of the sheet metal plate. If the strips are disposed in such a way, the downstream located edges lie at the level of the sheet metal plate and are fastened to the sheet metal plate, for example made of one piece.

Advantageous conditions result if the separation device has 3 to 10 strip-like areas. An advantageous effect on the separation of particles results if a wavy movement crosswise to the flow direction is impressed on the air flow, similar to that of waves in the water. If the flow direction in the area of the particle separation essentially extends crosswise to the direction of gravitation, the particles can fall down out of the hot air flow crosswise to the flow direction because of their inherent weight. In this connection it is advantageous if the impressed wavy motion extends in the direction of gravitation.

The separation of the particles on the basis of their own weight is particularly effective if the air stream in the area of the wave troughs located on the bottom in the direction of gravitation is passed along areas which are free of flow to a large extent and the particles sink downward out of the air flow in these areas.

BRIEF FIGURE DESCRIPTION

FIG. 1 shows a hot air oven in accordance with the invention in cross section from the side; and FIG. 2 shows the particle separator of the hot air oven in accordance with FIG. 1 in cross section in an enlarged representation.

DETAILED DESCRIPTION

Figure 1:
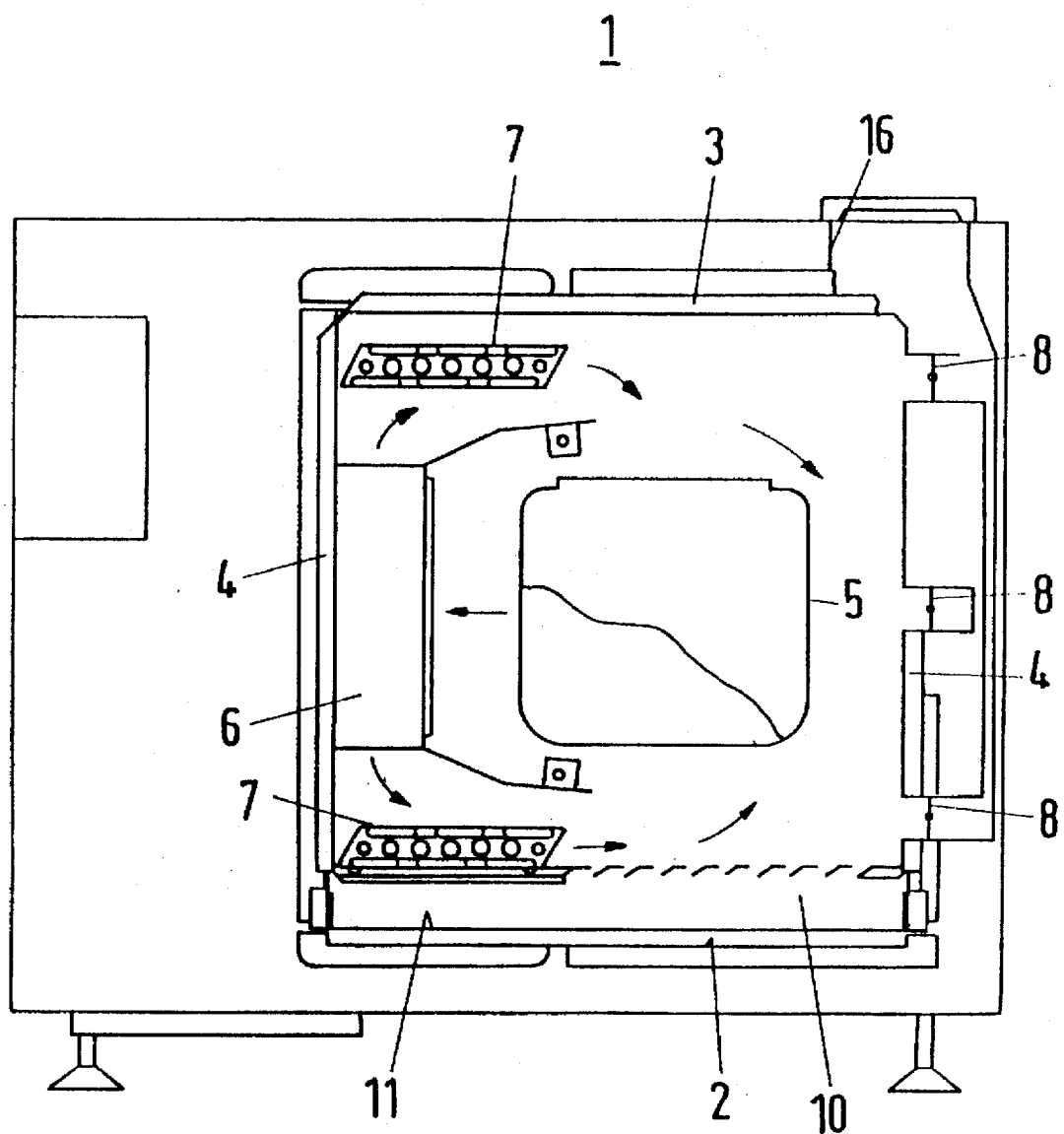

A hot air oven is identified as a whole by 1 in FIG. 1.

The hot air oven 1 comprises a cooking chamber delimited by a bottom 2, a ceiling 3 and side walls 4, in which a basket 5 is disposed rotatable around an axis placed vertically on the plane of projection and provided with a drive.

A blower 6 is laterally disposed next to the axis of rotation of the basket 5 and aspirates air from the direction of the basket and passes it on upward and downward in FIG. 1. Heating bodies 7 for heating the air present in the cooking chamber are located above and below the blower 6.

Air vents 8 are provided to bring air into and removing it from the cooking chamber.

A particle separator, identified as a whole by 10, is located in the bottom area of the hot air oven represented in FIG. 1 and is shown in cross section in the representation in FIG. 1.

A drawer 11 is located underneath the particle separator, which can be pulled out for removing the particles separated from the cooking chamber and can be cleaned. The lower branch of the hot air stream flows from left to right over the particle separator 10.

Figure 2:
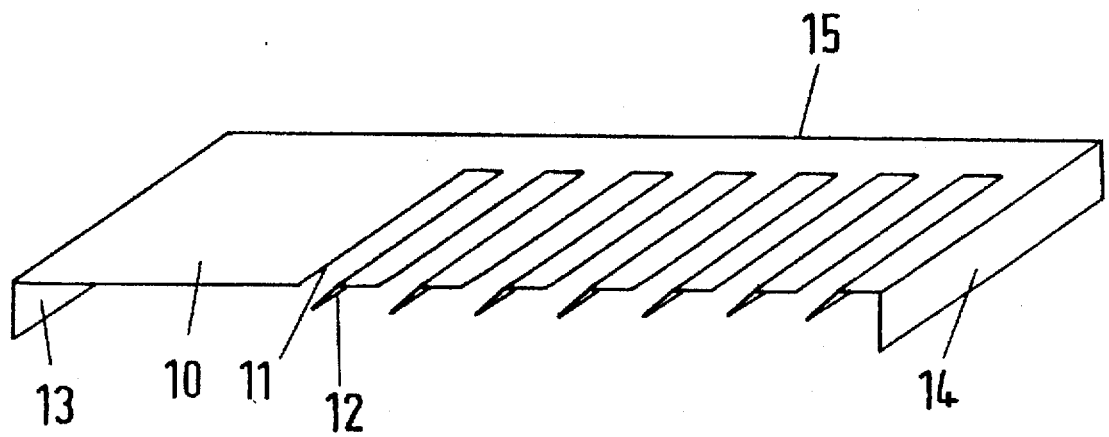

FIG. 2 shows the particle separator 10 in a cross section corresponding to the section in FIG. 1 and in an enlarged representation.

The particle separator 10 has an essentially flat rectangular surface which, in the installed position in FIG. 1, extends horizontally from left to right and perpendicularly in respect to the plane of the drawing. Approximately one third of the area of the surface is smooth and closed, wherein this area is intended to be inserted underneath the heating body 7. Essentially rectangular stampings 11 follow this area and form rectangular openings in the surface of the particle separator. A tongue-shaped section 12 corresponds to each opening, which is bent downward out of the plane of the surface of the particle separator 10 and angled in respect to the surface, wherein it is connected with the surface on one long side. Thus, a rectangular section has been cut out of the base material on three sides in the area of the stamping and has been bent out downward.

The particle separator is downwardly angled at two opposite ends 13 and 14 and therefore has two front walls for all practical purposes, which delimit the particle separator toward the exterior. At the position indicated by 15 in FIG.

2, a corresponding rear wall is angled off downwardly and is connected along its lateral edges with the side walls 13 and 14 and thus provides a rigid frame, whose front closing edge is not shown because of the cross-sectional representation in FIG. 2.

For use, the particle separator is inserted into the hot air oven in accordance with FIG. 1 and the hot air stream flows over it from left to right also in its position in FIG. 2.

The air conveyed by the hot air stream is first subjected to a certain downward movement in the area of the openings in the particle separator 10, which is subsequently diverted by the strip 12 to form an upward movement. At the next opening, first a downward movement occurs again and then an upward movement, so that the hot air as a whole experiences a wave motion. In accordance with the installation position, in this case the direction of the deviation extends parallel in respect to the gravitational force. The particles which in comparison with the air are more sluggish because of their density will follow the initial downward movement in the wave troughs and thus sink into lower air layers. However, there is essentially no air movement underneath the particle separator 10 in the hot air oven 1 in accordance with the invention, so that the particles can sink down there. In the hot air oven 1 in accordance with the invention the particle separation is so effective that a significant reduction of the particle concentration is already achieved in the first phase of the preparation process, before noticeable browning of the particles can occur. Because of the temperature distribution in the hot air oven 1, the temperature is lower in the area underneath the particle separator 10 than in the remaining cooking chamber, i.e. in the place where the drawer 11 is located, so that the particles deposited there do not burn. A combustion process would fill the air in the cooking chamber with smoke, which would lead to an impairment of the taste of the foodstuffs to be prepared.

If the oven 1 in accordance with the invention is operated with opened air inlet and outlet vents 8, an air exchange takes place during operation. The outgoing air, which is blown into an outgoing air conduit 16 through the upper and lower vent 8, can also still be loaded with particles. An extensive removal of the particles in the outgoing air is achieved with a very similar system. This system is not represented in the drawings, but will be briefly explained in what follows.

The outgoing air enters a cylindrical, perpendicularly disposed chute indicated at 16. The air intake is provided tangentially on the exterior, so that the air is given a circular movement. Strips are provided in the area of the bottom which correspond to the strips of the particle separator 10, but which are disposed in the radial direction starting at the center of the cylinder and horizontally. This arrangement is necessary to assure that the air meets the strips in the vertical direction, the same as in the particle separator 10. With this strip arrangement the effect is also provided that an upward and downward motion is impressed on the air, which leads to the particles sinking past the strips into the space of low flow below the strips in the area of the wave troughs.

However, the advantage of the invention is to be primarily seen in that during the first preparation phase the particles carried along in the air flow are already separated in the particle separator 10 before there is excess browning or even burning of the particles carried along in the air flow. That these particles cannot be prevented at the outset is due to the consistency of some foodstuffs to be prepared, for example frozen French fries. These foodstuffs always carry abraded particles or the like, which are removed from the surface of the French fries in the course of the rotating motion of the basket 5 together with the air moving through it and get into the hot air flow in this way. From there they are removed again in the hot air oven 1 in accordance with the invention before they can bring their quality-reducing effects to bear.

The quality of the prepared foodstuffs in respect to the particle deposits discussed here can also be improved by a process step while the preparation process is running or when it is inserted between individual preparation processes.

Very small particles which cannot be completely removed by means of the steps mentioned up to now can be separated if the blower rpm are greatly reduced at one time in the course of the preparation process, so that the air speed in the cooking chamber is reduced. Then even lighter particles which so far could not be separated can be removed in the area of the particle separator(s). Once these lighter particles are in the area of little movement of the particle separator, they are not again picked up by the air flow. At this time it is preferred to provide such a method step at least between two preparation processes, so that no particles from the previous preparation process can come into the following one.

We claim:

1. A hot air oven for the preparation of footstuffs,
   with a housing with four housing side walls, a bottom, and a housing cover,
   with a cooking chamber delimited by four side walls (4) as well as a bottom (2) and a ceiling (3),
   with a first blower (6) for generating a hot air flow in the cooking chamber,
   with a rotatable basket (5) for the foodstuffs, which can be inserted into the cooking chamber, wherein the hot air stream flows through the basket (5) during operation,
   with a control device regulating the cooking progress, wherein the control device includes a temperature control,
   wherein said hot air flow at least partially recirculates, and at least one separation device (10), serving to separate out particles conveyed in the hot air flow, is provided.

2. A hot air oven in accordance with claim 1, wherein the separation device (10) is oriented parallel to a bottom portion of said housing and includes a plurality of strips, disposed essentially crosswise to air flow direction, for affecting the air flow.

3. A hot air oven in accordance with claim 1, wherein the separating device (10) comprises an essentially flat sheet-metal plate, from which a number of strip-like areas, having long axes generally perpendicular to said airflow, and two major edges, have been bent out at an angle to remaining portions of said plate.

4. A hot air oven in accordance with claim 3, characterized in that the strip-like areas (12) are angled downward at 15° to 86° in respect to the level of the separation device (10).

5. A hot air oven in accordance with claim 3, characterized in that the strip-like areas (12) lie 3 mm to 18 mm below the level of the sheet metal plate at their edge oriented in the flow direction.

6. A hot air oven in accordance with claim 3, characterized in that the strip-like areas (12) are located with their downstream edge on the level of the sheet metal plate and are fastened on the sheet metal plate.

7. A hot air oven in accordance with claim 3, characterized in that the separating device (10) has 3 to 10 strip-like areas (12).

8. A hot air oven in accordance with claim 2, characterized in that the separating device (10) has 3 to 10 strip-like areas (12).

9. A method of separating particles from an air flow having an initial flow direction comprising the step of employing a separating device to impress a wavelike movement, crosswise to said initial flow direction, on said air flow.

10. A method in accordance with claim 9, characterized in that the flow direction in the area of the separation of the particles essentially extends crosswise to the gravitation direction.

11. A method in accordance with claim 9, characterized in that the impressed movement extends in the direction of gravitation.

12. A method in accordance with claim 9, characterized in that in the area of the wave troughs, located on the bottom in the gravitation direction, the air flow is moved past areas which are free of flow to a large degree, and the particles sink downward out of the air flow in these areas.

* * * * *